United States Patent
Li-Diaz et al.

(10) Patent No.: US 11,644,871 B1
(45) Date of Patent: May 9, 2023

(54) SYSTEMS AND METHODS FOR DETERMINING HINGE ANGLE POSITION IN AN INFORMATION HANDLING SYSTEM

(71) Applicant: Dell Products L.P., Round Rock, TX (US)

(72) Inventors: Kened Li-Diaz, Cedar Park, TX (US); Anthony W. Howard, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/670,230

(22) Filed: Feb. 11, 2022

(51) Int. Cl.
| | | |
|---|---|---|
| G06F 1/16 | (2006.01) | |
| E05D 11/00 | (2006.01) | |
| G01B 11/26 | (2006.01) | |

(52) U.S. Cl.
CPC .............. *E05D 11/00* (2013.01); *G01B 11/26* (2013.01); *G06F 1/1616* (2013.01); *G06F 1/1677* (2013.01); *E05Y 2400/44* (2013.01); *E05Y 2900/606* (2013.01)

(58) Field of Classification Search
CPC .............................. G06F 1/1677; G06F 1/1681
See application file for complete search history.

(56) References Cited

U.S. PATENT DOCUMENTS

| | | | | |
|---|---|---|---|---|
| 6,268,912 B1 * | 7/2001 | Brinkman | .............. | G01B 11/26 356/138 |
| 7,450,175 B2 * | 11/2008 | Yoon | .................... | H04N 23/531 348/E5.025 |
| 8,004,833 B2 * | 8/2011 | Tseng | ..................... | G06F 1/1677 455/575.8 |
| 8,295,899 B2 * | 10/2012 | Hashizume | ........... | H01Q 1/243 455/575.3 |
| 8,306,583 B2 * | 11/2012 | Symons | .............. | H04M 1/0216 455/41.1 |
| 9,316,717 B2 * | 4/2016 | Gicklhorn | ................. | G01S 5/18 |
| 9,389,647 B2 * | 7/2016 | Hwang | ................ | G06F 1/1681 |
| 10,345,865 B2 * | 7/2019 | Sharma | ................ | G06F 1/1679 |
| 10,864,570 B2 * | 12/2020 | Angerer | ................. | B21D 5/006 |
| 10,936,084 B2 * | 3/2021 | Okuley | ............... | H04N 13/239 |
| 10,955,880 B2 * | 3/2021 | Wang | .................. | H04M 1/0216 |
| 2008/0129953 A1 * | 6/2008 | Blum | ..................... | G02C 11/10 351/158 |
| 2010/0265648 A1 * | 10/2010 | Hirabayashi | .......... | G06F 1/1616 361/679.28 |
| 2014/0169853 A1 * | 6/2014 | Sharma | ................. | G06F 3/0202 400/481 |
| 2018/0038948 A1 * | 2/2018 | Kemppinen | .......... | G06F 1/1624 |
| 2021/0278881 A1 * | 9/2021 | Atom | .................... | G06F 1/1637 |
| 2021/0349498 A1 * | 11/2021 | Lin | ....................... | G06F 1/1681 |
| 2021/0365075 A1 * | 11/2021 | Lin | ...................... | H05K 5/0247 |

* cited by examiner

*Primary Examiner* — Adrian S Wilson
(74) *Attorney, Agent, or Firm* — Jackson Walker L.L.P.

(57) ABSTRACT

An information handling system may be implemented as a notebook, comprising a first assembly, a second assembly, a hinge mechanically coupling the first assembly to the second assembly wherein the hinge comprises a surface having an apparent reflectivity of light which is variable from a first location of the surface to a second location of the surface, a source of light configured to project light onto a surface of the hinge, and a sensor configured to detect an intensity of light reflected from the surface of the hinge.

20 Claims, 5 Drawing Sheets

SYSTEMS AND METHODS FOR DETERMINING HINGE ANGLE POSITION IN AN INFORMATION HANDLING SYSTEM

TECHNICAL FIELD

The present disclosure relates in general to information handling systems, and more particularly to determining a hinge angle position in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Notebook computers (sometimes referred to as laptop computers) have become increasingly popular for use in business and education. It is often desirable in notebook computers to detect an angle between a keyboard assembly and a display assembly rotatably coupled to one another via a hinge. Such information may be used to transition between power states of a notebook computer, as well as being used to indicate when certain components of an information handling system (e.g., camera, proximity sensors, etc.) are likely to be unused so that such components may be powered down. Traditionally, hinge angle detection is performed by the use of a magnet and a magnetic sensor (e.g. a Hall sensor), but such approach has many disadvantages. For instance, as compared to electronic devices of similar size, magnets are typically heavier. As another example, a magnetic sensor may be prone to external interference (e.g., a magnetized device or other electromagnetic-energy emitting device placed close to the sensor). As a further example, detection using a magnet and magnetic sensor often provides limited granularity of angular position, typically resulting in a magnetic sensor practically being used as a binary sensor (e.g., notebook open or closed). As an additional example, at product end-of-life, plastics and composites recycling may require dedicated steps for magnet separation.

Accordingly, improved systems and methods for detecting a hinge angle may be desired.

SUMMARY

In accordance with the teachings of the present disclosure, one or more disadvantages and problems associated with existing approaches to detecting a hinge angle in an information handling system may be reduced or eliminated.

In accordance with embodiments of the present disclosure, an information handling system may be implemented as a notebook, comprising a first assembly, a second assembly, a hinge mechanically coupling the first assembly to the second assembly wherein the hinge comprises a surface having an apparent reflectivity of light which is variable from a first location of the surface to a second location of the surface, a source of light configured to project light onto a surface of the hinge, and a sensor configured to detect an intensity of light reflected from the surface of the hinge.

In accordance with these and other embodiments of the present disclosure, a method may be provided for use in an information handling system implemented as a notebook, wherein the information handling system comprises a first assembly, a second assembly, a hinge mechanically coupling the first assembly to the second assembly and comprising a surface having an apparent reflectivity of light which is variable from a first location of the surface to a second location of the surface, a source of light configured to project light onto a surface of the hinge, and a sensor configured to detect an intensity of light reflected from the surface of the hinge. The method may include receiving a signal from the sensor indicative of the intensity and determining a hinge angle of the first assembly relative to the second assembly based on the signal.

In accordance with these and other embodiments of the present disclosure, a method for forming an information handling system may include mechanically coupling a first assembly to a second assembly via a hinge comprising a surface having an apparent reflectivity of light which is variable from a first location of the surface to a second location of the surface, configuring a source of light to project light onto a surface of the hinge, and configuring a sensor to detect an intensity of light reflected from the surface of the hinge.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
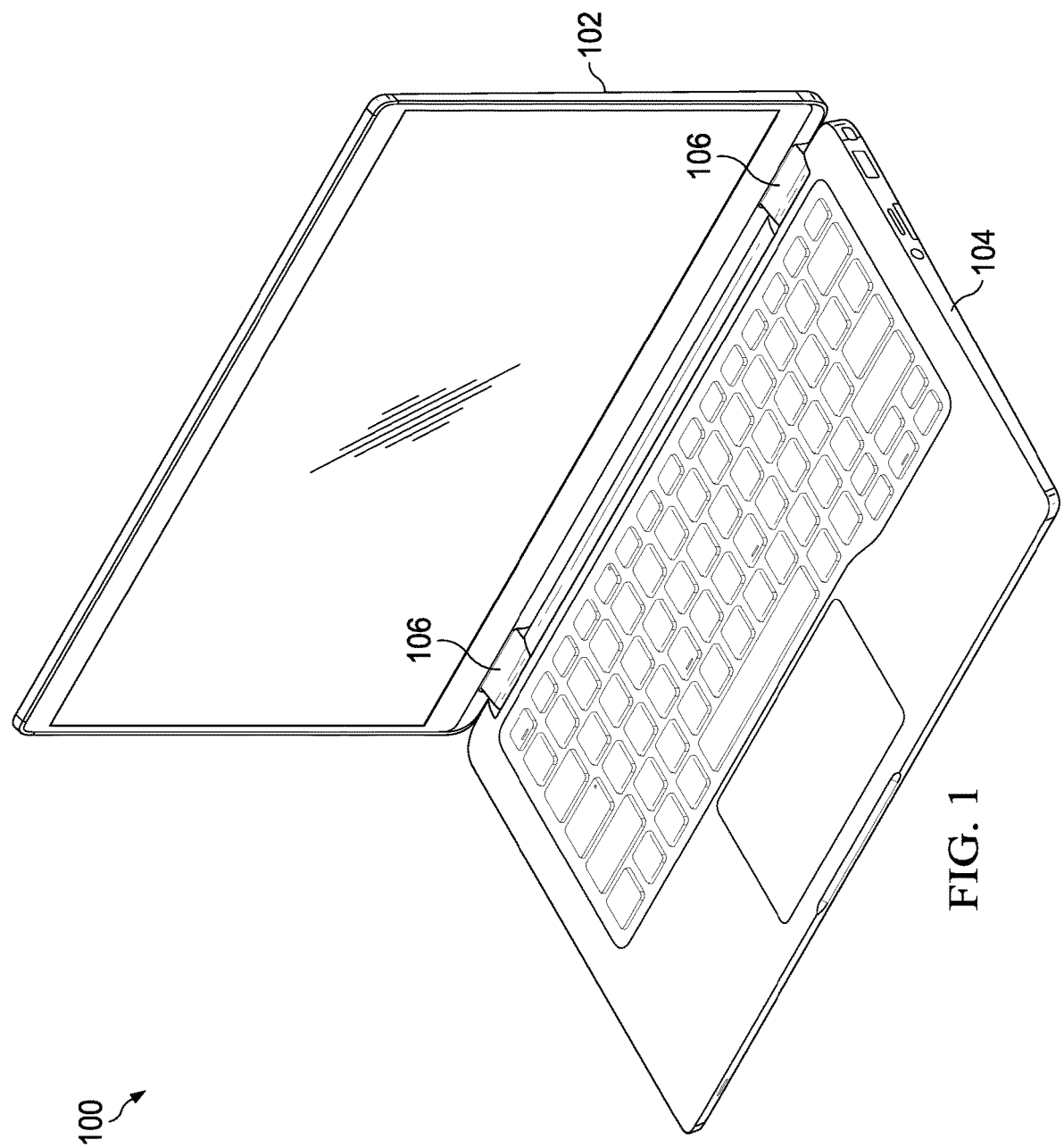
FIG. 1 illustrates an example notebook, in accordance with embodiments of the present disclosure.

FIG. 1 depicts an example notebook 100, in accordance with embodiments of the present disclosure. Notebook 100 may comprise an information handling system. As shown in FIG. 1, notebook 100 may include a display assembly 102 and a keyboard assembly 104 rotatably coupled to one another via one or more hinges 106.

Figure 2A:
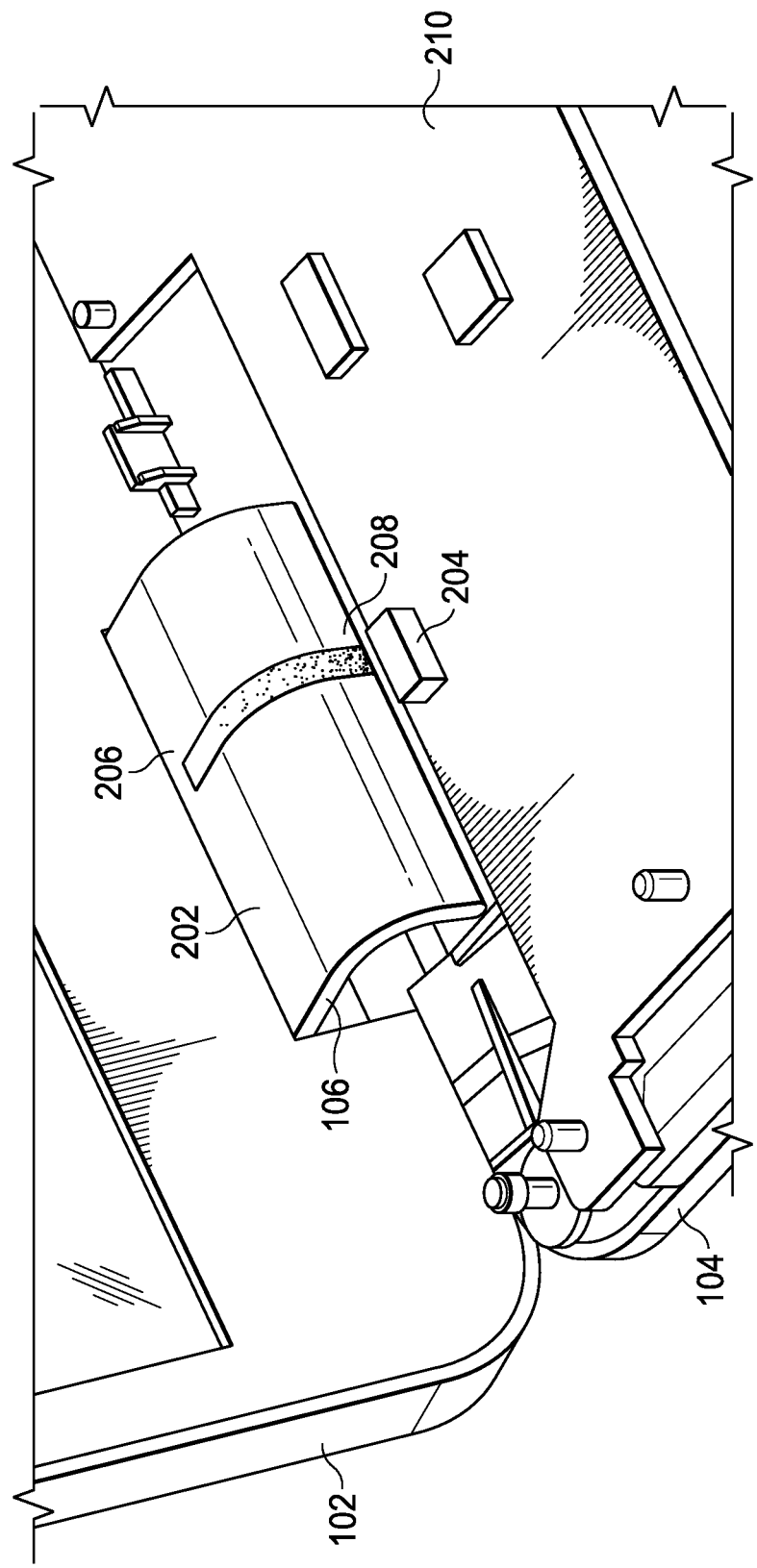
FIG. 2A illustrates a detailed perspective view of the example notebook shown in FIG. 1 with portions of its keyboard assembly removed, in accordance with embodiments of the present disclosure.
Figure 2B:
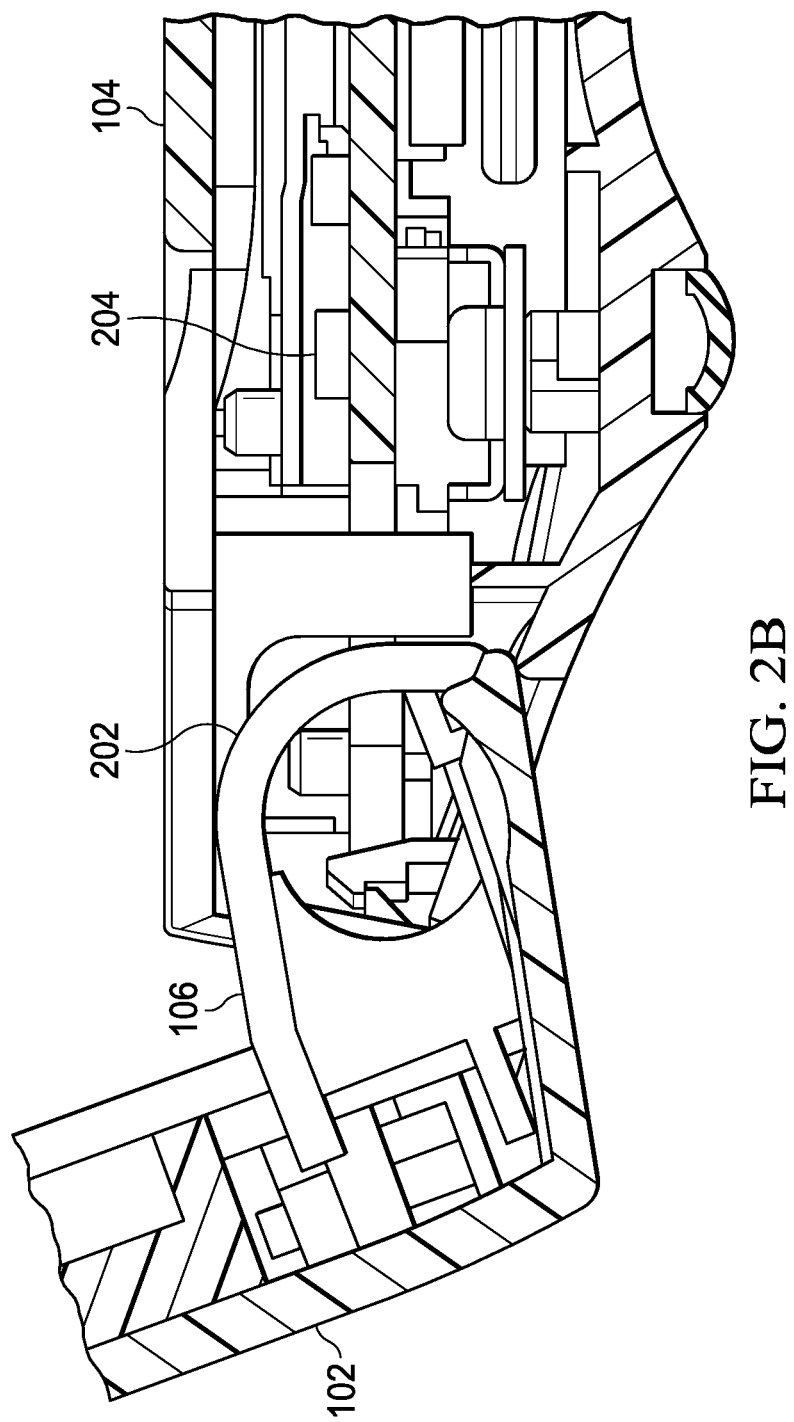
FIG. 2B illustrates a cross-sectional side elevation view of the example notebook shown in FIG. 1, in accordance with embodiments of the present disclosure.

FIG. 2A illustrates a detailed perspective view of selected portions of notebook 100 with portions of keyboard assembly 104 removed, in accordance with embodiments of the present disclosure. FIG. 2B illustrates a cross-sectional side elevation notebook 100, in accordance with embodiments of the present disclosure. In particular, FIGS. 2A and 2B depict details present at and proximate to a hinge 106. For example, as shown in FIGS. 2A and 2B, hinge 106 may include a surface 202 having at least a portion thereof with a monotonic gradient of apparent reflectivity of light between a top edge 206 of surface 202 and a bottom edge 208 of surface 202. As another example, within the enclosure of keyboard assembly 104, a combined light source and sensor 204 may be surface mounted to a circuit board 210. Circuit board 210 may also include or may otherwise be communicatively coupled to processing components of notebook 100. Combined light source and sensor 204 may include any suitable system, device, or apparatus (e.g., a light-emitting diode) configured to project light towards surface 202 of hinge 106 and may also include any suitable system, device, or apparatus (e.g., a photodiode or other photosensor) to detect intensity of such projected light reflected from surface 202.

Although the foregoing contemplates that combined light source and sensor 204 includes a light source and sensor integrated into a single component, it is understood that in some embodiments, such light source and sensor may be separated into separate electronic components.

Figure 3:
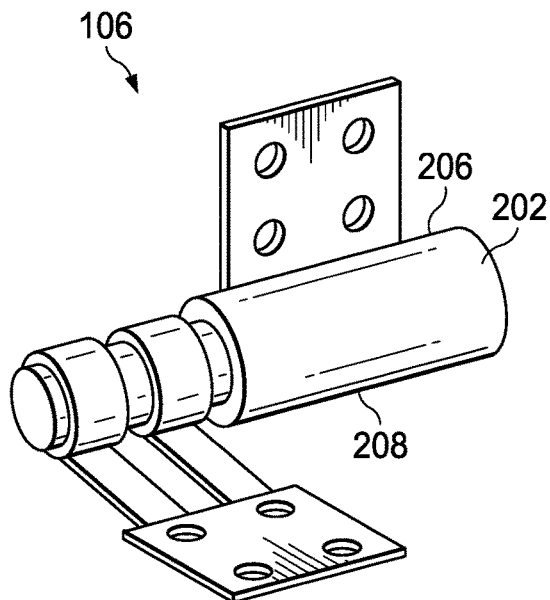
FIG. 3 illustrates an example hinge of the example notebook shown in FIG. 1, in accordance with embodiments of the present disclosure.

FIG. 3 illustrates example hinge 106, in accordance with embodiments of the present disclosure. As described above but shown in more detail in FIG. 3, surface 202 may have at least a portion thereof with a monotonic gradient of apparent reflectivity of light between top edge 206 of surface 202 and bottom edge 208 of surface 202. As an example, as shown in FIG. 3, portions of surface 202 at top edge 206 may appear to the sensor of combined light source and sensor 204 to be less reflective of light, and the apparent reflectivity of light (from the standpoint of the sensor of combined light source and sensor 204) from surface 202 may increase from top edge 206 to bottom edge 208. However, in other embodiments, surface 202 may be configured such that the apparent reflectivity of light from surface 202 may decrease from top edge 206 to bottom edge 208.

Figure 4A:
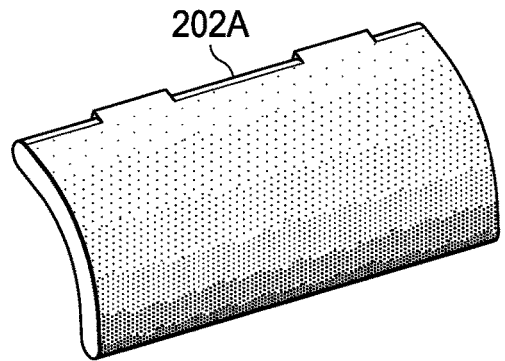
FIGS. 4A-4C each illustrates an example hinge cover for a hinge of the example notebook shown in FIG. 1, in accordance with embodiments of the present disclosure.

The monotonic gradient of apparent reflectivity of light between top edge 206 of surface 202 and bottom edge 208 of surface 202 may be implemented in any suitable manner. For example, as shown in FIG. 4A, a surface 202A may comprise a variable texture, such that certain portions of surface 202A directly reflect a significant portion of light towards a source of such light, while other portions of surface 202A scatter light away from the source of such light, thus creating an appearance, from a location of the source of such light, of varied reflectivity across surface 202A.

Figure 4B:
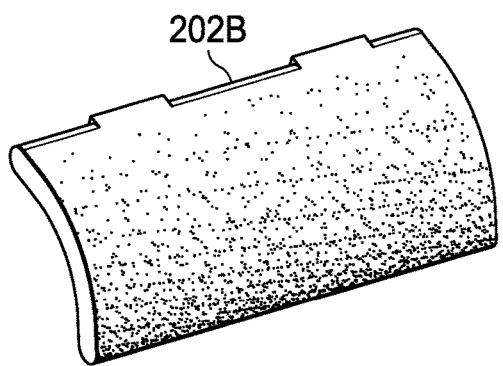

As another example, as shown in FIG. 4B, a surface 202B may comprise a variable pattern (e.g., splatter pattern of colored paint), such that certain portions of surface 202B directly reflect a significant portion of light towards a source of such light, while other portions of surface 202B absorb light or scatter light away from the source of such light, thus creating an appearance, from a location of the source of such light, of varied reflectivity across surface 202B.

Figure 4C:
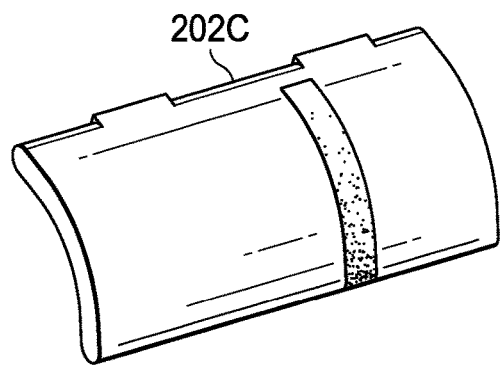

As a further example, as shown in FIG. 4C, a surface 202C may comprise an indicator stripe that varies in reflectivity from one end of the indicator stripe to the other, such that certain portions of surface 202C directly reflect a significant portion of light towards a source of such light, while other portions of surface 202C absorb light, thus creating an appearance, from a location of the source of such light, of varied reflectivity across surface 202C.

Figure 5:
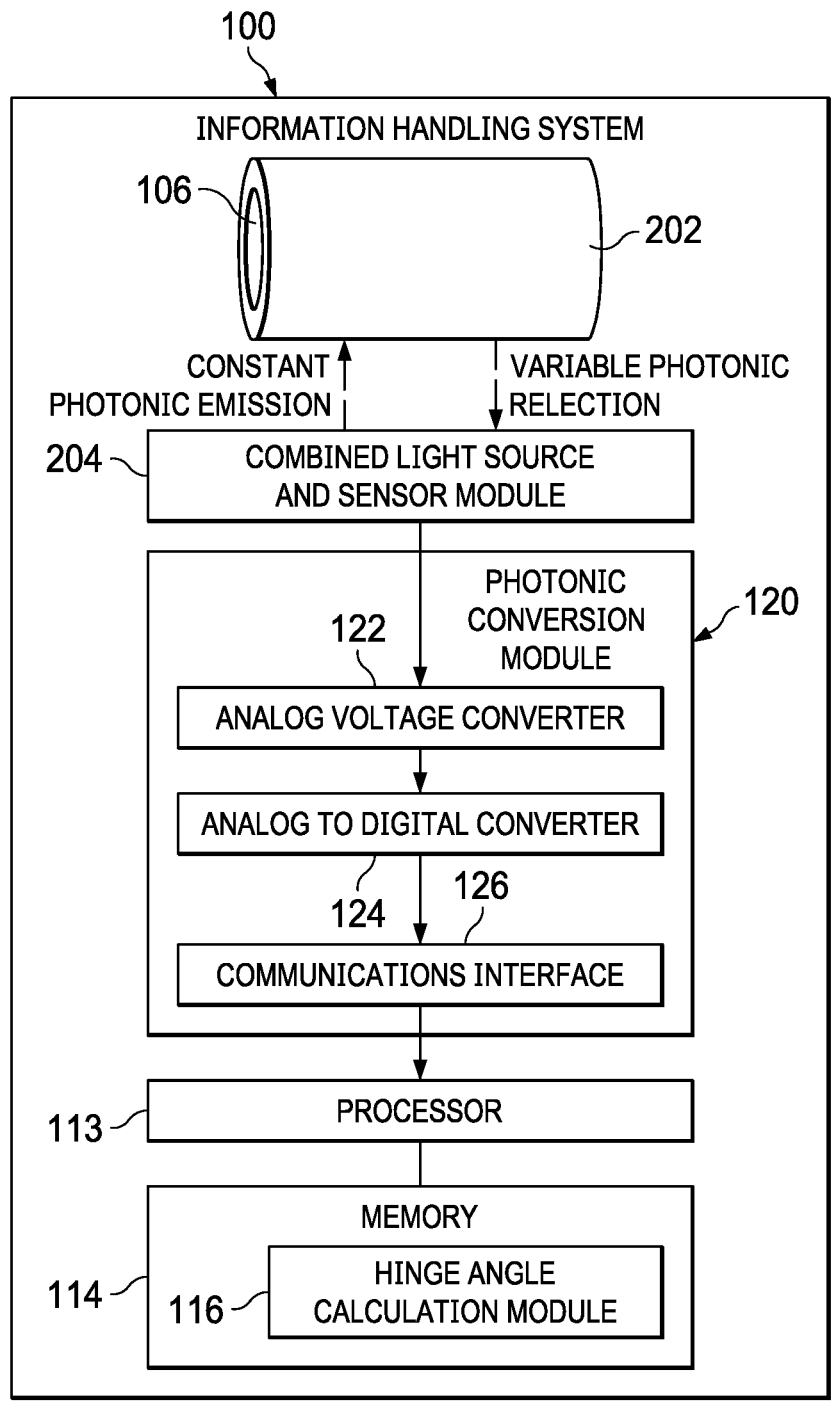
FIG. 5 illustrates a block diagram of selected components of an information handling system, in accordance with embodiments of the present disclosure.

FIG. 5 illustrates a block diagram of selected components of notebook 100, in accordance with embodiments of the present disclosure. As depicted in FIG. 1, notebook 100 may include a processor 113, a memory 114 communicatively coupled to processor 113, hinge 106, combined light source and sensor 204 communicatively coupled to processor 113, and photonic conversion module 120.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of notebook 100.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to notebook 100 is turned off.

As shown in FIG. 5, memory 114 may have a hinge angle calculation module 116 embodied therein. Hinge angle calculation module 116 may be communicatively coupled to processor 113, and may comprise a program of instructions configured to, when read by processor 113 from memory 114 and executed by processor 113, determine a hinge angle of display assembly 102 relative to keyboard assembly 104, based on an intensity of light detected by combined light source and sensor 204, as described in greater detail below.

Although the foregoing contemplates hinge angle calculation module 116 being implemented in software, in some embodiments, hinge angle calculation module 116 may be implemented in whole or in part by hardware which may or may not be integral to processor 113.

Photonic conversion module 120 may comprise any system, device or apparatus configured to receive an analog signal (e.g., a voltage signal) from combined light source and sensor module 204 indicative of an intensity of light sensed by combined light source and sensor module 204, convert such analog signal into an equivalent digital signal, and communicate such equivalent digital signal to processor 113 for processing by hinge angle calculation module 116. As shown in FIG. 5, photonic conversion module 120 may include analog voltage converter 122, analog-to-digital converter 124, and communications interface 126.

Analog voltage converter 122 may include any suitable analog circuitry, including without limitation an analog front-end and/or an analog amplifier, configured to condition the signal received from combined light source and sensor module 204 for conversion by analog-to-digital converter 124.

Analog-to-digital converter 124 may receive the voltage signal generated by analog voltage converter 122 to generate an equivalent digital signal having a fixed sequence length of "0s" and "1s" representative of the specific angular rotation of hinge 106.

Communications interface 126 may represent any suitable communications interface (e.g., Inter-Integrated Circuit or "I2C") for communicating the equivalent digital signal to processor 113 for processing by hinge angle calculation module 116.

In addition to processor 113, memory 114, hinge 106, combined light source and sensor 204, and photonic conversion module 120, notebook 100 may include one or more other information handling resources.

In operation, combined light source and sensor module 204 may project photonic emissions in the form of light onto surface 202 of hinge 106. In some embodiments, such projection of photons may be constant. In other embodiments, the emission of photons may be in response to a triggering event (e.g., such triggering event may comprise an accelerometer, gyroscope, and/or other sensor (not explicitly shown in the figures) of notebook 100 indicating a change in position of either or both of display assembly 102 and keyboard assembly 104). As noted above, surface 202 may be coated, painted, treated, or otherwise configured such that it provides a monotonic change in apparent reflectivity as the angular rotation of hinge 106 varies. Thus, a percentage of the photons emitted from combined light source and sensor module 204 and reflected back to combined light source and sensor module 204 may be a monotonically increasing or decreasing function of the angular rotation of hinge 106. Accordingly, an analog signal (e.g., voltage) generated by combined light source and sensor module 204 may be a monotonically increasing or decreasing function of the angular rotation of hinge 106.

Photonic conversion module 120 may convert such analog signal into an equivalent digital signal, and communicate such equivalent digital signal to processor 113. Such equivalent digital signal may be a monotonically increasing or decreasing function of the angular rotation of hinge 106.

Hinge angle calculation module 116 may receive a stream of equivalent digital signals and calculate a hinge angle between display assembly 102 relative to keyboard assembly 104 as a function of the equivalent digital signal, which is in turn a measurement of intensity of light from combined light source and sensor 204. For example, in some embodiments, hinge angle calculation module 116 may apply an equation to translate the measurement of intensity of light into a corresponding hinge angle. As another example, in other embodiments, hinge angle calculation module 116 may use the measurement of intensity of light as an index to a lookup table that sets forth hinge angles corresponding to each of a plurality of measured light intensities.

Based on the hinge angle, hinge angle calculation module 116 may determine if display assembly 102 is in a closed position or an open position relative to keyboard assembly 104, and take action based on such determination, such as waking notebook 100 if moved from a closed position to an open position or sleeping/placing notebook 100 in standby mode if moved from an open position to a closed position.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system implemented as a notebook, comprising:
    a first assembly;
    a second assembly;
    a hinge mechanically coupling the first assembly to the second assembly, the hinge comprising a surface having an apparent reflectivity of light which is variable from a first location of the surface to a second location of the surface;
    a source of light configured to project light onto a surface of the hinge; and
    a sensor configured to detect an intensity of light reflected from the surface of the hinge.

2. The information handling system of claim 1, further comprising a processing device configured to:
    receive a signal from the sensor indicative of the intensity; and
    determine a hinge angle of the first assembly relative to the second assembly based on the signal.

3. The information handling system of claim 1, wherein the apparent reflectivity of light is monotonically variable from the first location to the second location.

4. The information handling system of claim 1, wherein the surface comprises a texture that varies between the first location and the second location.

5. The information handling system of claim 1, wherein the surface comprises a pattern that varies between the first location and the second location.

6. The information handling system of claim 1, wherein the surface varies in lightness and darkness between the first location and the second location.

7. The information handling system of claim 1, wherein:
    the first assembly comprises a keyboard assembly comprising a keyboard; and
    the second assembly comprises a display assembly comprising a display device.

8. A method, for use in an information handling system implemented as a notebook, wherein the information handling system comprises a first assembly, a second assembly, a hinge mechanically coupling the first assembly to the second assembly, wherein the hinge comprises a surface having an apparent reflectivity of light which is variable from a first location of the surface to a second location of the surface, a source of light configured to project light onto a surface of the hinge, and a sensor configured to detect an intensity of light reflected from the surface of the hinge, the method comprising:
    receiving a signal from the sensor indicative of the intensity; and
    determining a hinge angle of the first assembly relative to the second assembly based on the signal.

9. The method of claim 8, wherein the apparent reflectivity of light is monotonically variable from the first location to the second location.

10. The method of claim 8, wherein the surface comprises a texture that varies between the first location and the second location.

11. The method of claim 8, wherein the surface comprises a pattern that varies between the first location and the second location.

12. The method of claim 8, wherein the surface varies in lightness and darkness between the first location and the second location.

13. The method of claim 8, wherein:
    the first assembly comprises a keyboard assembly comprising a keyboard; and
    the second assembly comprises a display assembly comprising a display device.

14. A method for forming an information handling system, comprising:
    mechanically coupling a first assembly to a second assembly via a hinge comprising a surface having an apparent reflectivity of light which is variable from a first location of the surface to a second location of the surface;
    configuring a source of light to project light onto a surface of the hinge; and
    configuring a sensor to detect an intensity of light reflected from the surface of the hinge.

15. The method of claim 14, further comprising coupling a processing device to the sensor, the processing device configured to:
    receive a signal from the sensor indicative of the intensity; and
    determine a hinge angle of the first assembly relative to the second assembly based on the signal.

16. The method of claim 14, wherein the apparent reflectivity of light is monotonically variable from the first location to the second location.

17. The method of claim 14, wherein the surface comprises a texture that varies between the first location and the second location.

18. The method of claim 14, wherein the surface comprises a pattern that varies between the first location and the second location.

19. The method of claim 14, wherein the surface varies in lightness and darkness between the first location and the second location.

20. The method of claim 14, wherein:
- the first assembly comprises a keyboard assembly comprising a keyboard; and
- the second assembly comprises a display assembly comprising a display device.

\* \* \* \* \*